Figure 1:
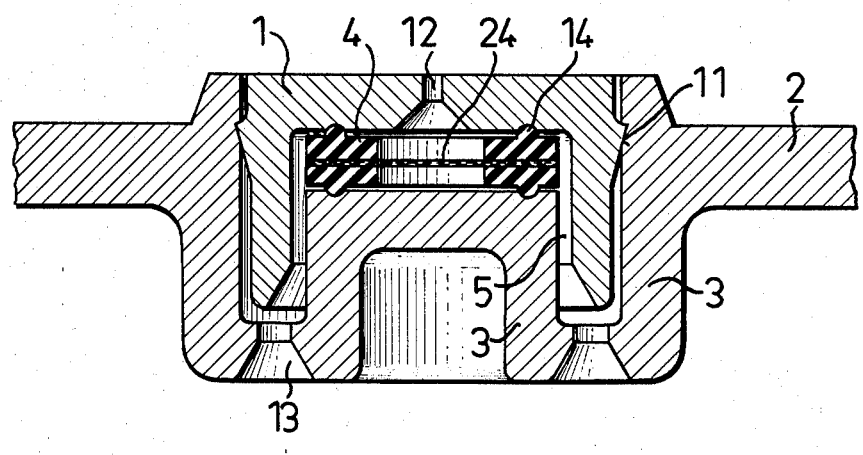

United States Patent [19]
Klar et al.

[11] 4,349,122
[45] Sep. 14, 1982

[54] SEALING ELEMENT

[75] Inventors: Rudolf Klar; Ulrich Beier, both of Northeim, Fed. Rep. of Germany

[73] Assignee: Continental Gummi-Werke Aktiengesellschaft, Hanover, Fed. Rep. of Germany

[21] Appl. No.: 256,815

[22] Filed: Apr. 23, 1981

[30] Foreign Application Priority Data

Apr. 24, 1980 [DE] Fed. Rep. of Germany ....... 3015775

[51] Int. Cl.$^3$ ............................................. B65D 51/16
[52] U.S. Cl. .................................. 220/373; 220/374; 220/378
[58] Field of Search ......................... 220/373, 374, 378

[56] References Cited

U.S. PATENT DOCUMENTS 3,507,708  4/1970  Vignaud ........................... 220/373 X
3,696,958  10/1972 Lee ................................... 220/374 X
4,136,796  1/1979  DuLois et al. ................... 220/373 X Primary Examiner—George T. Hall
Attorney, Agent, or Firm—Becker & Becker, Inc.

[57] ABSTRACT

An annular sealing element, made of rubber or rubber-like synthetic material, for insertion between rigid surfaces resting upon each other. The sealing element is provided with at least one insert of textile fibers extending essentially transverse to the sealing direction, with the insert being covered by a rubber or synthetic material layer, yet exposed along its inner and outer periphery or surface.

9 Claims, 2 Drawing Figures

SEALING ELEMENT

The present invention relates to an annular or ring-shaped sealing element, made of rubber or rubber-like synthetic material or elastomer, and placed between rigid surfaces resting upon each other.

A preferred, though in no way exclusive field of application for the present invention, exists in connection with closures for containers of liquids inclined to evolve gas, as for example for household cleaners and also for transport and service containers for other liquids and solvents of low surface tension and correspondingly high rate of evaporation. The necessary liquid-tight closing of the containers, on the other hand, leads to the development of an undesired vapor pressure, which can equalize itself only later when opening the closure, and which, due to the vigorous flow resulting therefrom, brings about problems or difficulties in handling and, depending on the type of liquid, more or less severely endangers the operating personnel themselves as well as the immediate environment. The recommendation expressed frequently in practice as a safety measure, namely to close the closure only partially, accepts the loss of a complete liquid sealing in exchange for the obtained pressure equalization; but such a recommendation is to be rejected because of the possibilities for unforeseeable damages created thereby. The same is true also for the installation of separate venting openings, and similar expedients, bypassing the liquid closure.

The object of the present invention, in comparison, is to provide a novel configuration of a sealing element which is both liquid-tight and also sufficiently gas-permeable, and which is further able to seal containers for liquids of all types capable of evaporation in a drip-tight manner and simultaneously without the danger of the development of an overpressure, while disregarding the arrangement and position of these containers.

Figure 2:
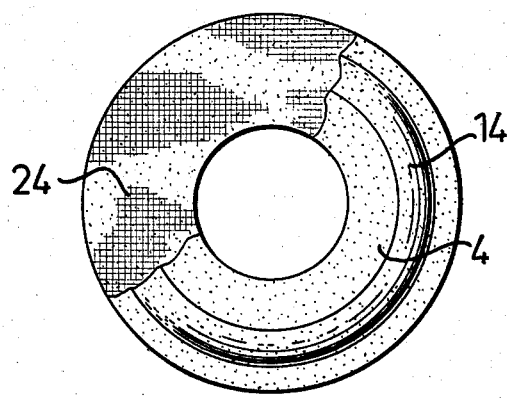

This object, and other objects and advantages of the present invention, will appear more clearly from the following specification in connection with the accompanying drawing, in which:

FIG. 1 is a top or plan view of one embodiment of a sealing element having features in accordance with the present invention; and FIG. 2 is a partially sectioned plan view to show the sealing element of FIG. 1.

The sealing element of the present invention is characterized primarily in that it is provided with at least one insert of textile fibers extending essentially transverse to the sealing direction; the insert is covered on both sides by a closed rubber layer or synthetic material layer, while it is exposed along its inner and outer periphery or surface. The inserts in the form of a fleece or felt strip can be made of fibers twisted or glued to each other in an irregular pattern; however, in a preferred embodiment of the present invention, the inserts can also be made of threads or filaments interlinked with each other in cross connection or banding. The free accessibility of the insert fibers at the inner and also the outer peripheral edge of the elastomeric layer body is of essential importance in any case. According to an important partial feature of the present invention, the sealing element is for this purpose provided with peripheral edges produced with mechanical machining means, for example, by stamping or a similar machining process.

The present invention creates a sealing element, which is especially suitable for container screw caps in general but also for other closure means and locking devices of every type, and which, aside from its reliable sealing effect relative to the closed off liquid based on the elastomeric component, leaves open a diffusion path which so to speak bypasses the liquid and extends in transverse direction thereto while being accessible exclusively for gaseous materials. The extent of the diffusion can be accurately defined by selecting the embedded fibers according to their origin and denier or titer, by their arrangement and interconnection relative to each other and by the composition of the insert in its entirety; the extent of the diffusion can further be adapted to the particular prevailing requirements dictated primarily by the properties of the liquid used. On the other hand, the elastomeric material covering the fiber layer has no influence on this mode of operation, so that it can be selected freely and without the necessity for compromises from the multiplicity of available mixtures of synthetic and natural rubbers or other rubber-like synthetic materials. The present invention accordingly simultaneously offers a wide range of possibilities for a cost-advantageous production.

The diffusion within the novel sealing elements is not restricted to any particular direction, but can occur both from the inside to the outside and also from the outside to the inside. In addition to its special application for gas-evolving liquids, the present invention encompasses in general every situation concerned with conveying gas or vapor, such as, for example, the pressure equalization for containers filled with hot filling material which, with increasing cooling off, initiates the inflow of atmospheric air.

According to further features of the present invention, the sealing element may be embodied as a flat annular disc with annular ribs formed thereon, which are located on one or both sides and are spaced from the peripheral edges thereof. To form a closure, the sealing element, in the installed state, may be held be peripheral edges which block a passage located between the rigid surfaces and leading from the sealed-off space, for instance, to the free atmosphere. The peripheral edges of the sealing element, at least over larger curved segments, may be held at a distance, defined by an annular gap, from closure parts cooperating with the rigid surface.

Referring now to the drawing in detail, the cross-sectional view of FIG. 2 shows a central longitudinal section through a novel sealing element installed in a closure cap for household cleaners. The illustrated closure cap is located on the venting or degasification cartridge of the cleaner. The closure cap includes as a movable part a sleeve 1 which is press fit into a sealing basin or cup 3 which is integral with the container wall 2. In place of the positive locking mechanism indicated by an annular shoulder 11, a screw connection can also be provided for the sleeve 1. Such screw connection is not shown specifically in the drawing, but is mentioned as an alternative arrangement with which the features of the present invention must also be considered applicable. The end faces of the sleeve 1 and of the sealing cup 3, which surfaces face each other, form the surface to be sealed relative to each other. The inventive sealing element 4 is inserted between these surfaces as a blocking member for interrupting the flow route from several bores 13, provided along the inner periphery of the sealing cup 3, to a venting or degasifying bore 12 in the sleeve 1.

The sealing element 4 is in the shape of an annular disc having formed thereonto bead-like annular ribs 14, which are provided concentrically on both sides and coaxially relative to each other; the sealing element 4 is built up of two rubber layers enclosing therebetween, and covering without interruption, a fabric insert 24. The fabric insert 24, made for example of man-made fibers with cross banding or connection of the fibers among each other, is exposed by a stamping process along the inner periphery and also along the outer periphery of the sealing element, and thus is freely accessible, on the one hand, for entry of the container contents and, on the other hand, of the outer atmosphere. In order to fully utilize the thus offered possibilities, the cylindrical inner part of the sleeve 1, which overlaps the sealing element 4, encloses, together with the associated section of the sealing cup 3, an annular gap 5 which also surrounds the sealing element in its installed condition; the annular gap 5 forms a portion of the internal flow route. The annular ribs 14 are received in identically shaped grooves in the counter or opposing surfaces of the closure parts, so that the sealing element is positively held and secured against lateral shifting or displacement without the necessity to effect a strong pressure which could negatively affect the desired diffusion.

Examples of the materials can be given to facilitate understanding of the present invention; since the weave insert 24 is not subject to any special demand thereon as to the strength and stability thereof, nearly all types of fibers are pertinent for the construction thereof. A selection can be made exclusively on the basis of an advantageous price or cost. Possible materials under these circumstances are for instance wool yarn and moreover cotton, including also animal wool, flax, hemp, sisal or also in place thereof commercial fibers which accordingly also means natural or synthetic polymers including rayon (staple fiber, regenerated cellulose, rayon staple, synthetic wool made of cellulose or rayon, or imitation silk) and polyester fibers or polyamide fibers (Nylon).

Rubber-like synthetic materials on the other hand aside from synthetic or man-made rubber include other elastomeric synthetic materials, such as fluoro-elastomers, polyacrylates, polyurethane, Hypalon for instance sulfochlorinated polyethylene and the like.

FIG. 2 of the drawing shows the element 24 including the sealing portion 14 thereof partially sectioned to facilitate illustration of the element 24 as the sealing disc separated from all metallic fittings or mountings as shown alone in a plan view having the upper cover layer partially broken away.

In evaluating the utilization of the sealing element for the present invention, the actual essence thereof is directed to the special manner of installation of the sealing discs requiring a free space at the inner and outer peripheral surfaces thereof for completely fulfilling the technical function of namely diverting away gases diffused out or away therefrom. There is noted also for purpose of general interest that the drawing illustrations are substantially at a scale of 10:1. This means one of the illustrated sealing discs in the original or actual size thereof has an outer diameter of only 10 mm with a layer thickness of 2 mm.

The present invention is, of course, in no way restricted to the specific disclosure of the specification and drawing, but also encompasses any modifications within the scope of the appended claims.

What we claim is:

1. An annular sealing element for placement between rigid surfaces adapted to rest upon one another, said sealing element comprising:
   at least one insert of textile fibers which extend essentially transverse to the sealing direction, said insert having outer peripheral edges, inner peripheral edges, and opposing surfaces extending between and connected by said peripheral edges; and
   on each of said opposing surfaces, an uninterrupted layer of elastomeric material selected from the group consisting of rubber and rubber-like synthetic material, said insert being covered by said respective elastomeric layers in such a way that said outer and inner peripheral edges of said insert are exposed.

2. A sealing element according to claim 1, in which exposure of said peripheral edges of said insert is effected by mechanical machining.

3. A sealing element according to claim 1, in which said fibers of said insert form an irregular pattern.

4. A sealing element according to claim 3, in which said fibers are twisted together.

5. A sealing element according to claim 3, in which said fibers are glued to one another.

6. A sealing element according to claim 1, in which said fibers are filaments interlinked with one another in cross connection.

7. A sealing element according to claim 1, which is a substantially flat annular disc and is provided with annular ribs on that surface of at least one of said elastomeric layers remote from said insert, said ribs being spaced radially inwardly from the outer peripheral edges of said associated layer.

8. A sealing element according to claim 7, in which a passage is located between said rigid surfaces for establishing communication between a sealed-off chamber and a space beyond said rigid surfaces, said sealing element, in the installed state, being held in position and blocking said passage by means of said annular ribs.

9. A sealing element according to claim 8, in which closure parts cooperate with said rigid surfaces, and in which the outer peripheral edges of said sealing element, at least over larger curved segments, are spaced from said cooperating closure parts to form an annular gap therebetween.

* * * * *